July 28, 1970 — H. BUERGER — 3,521,933
WHEEL RIM MOUNTED DEVICES
Filed Aug. 7, 1968
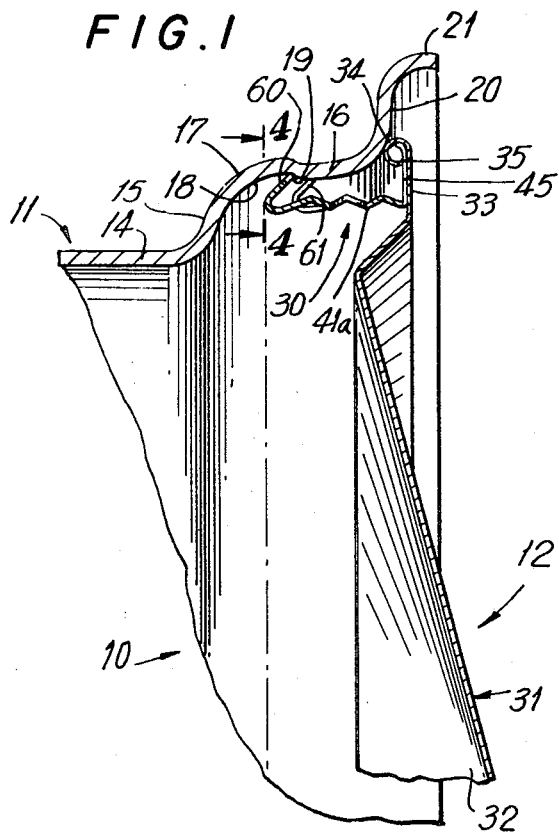
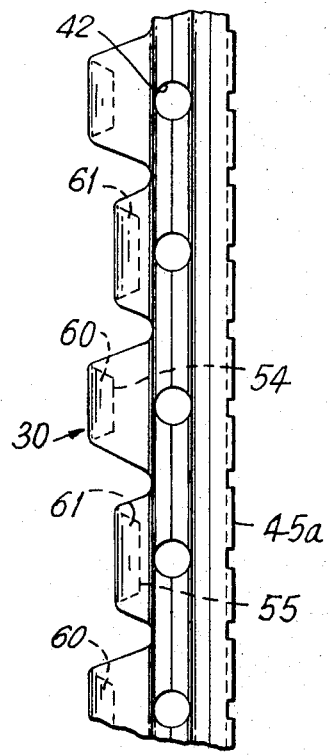
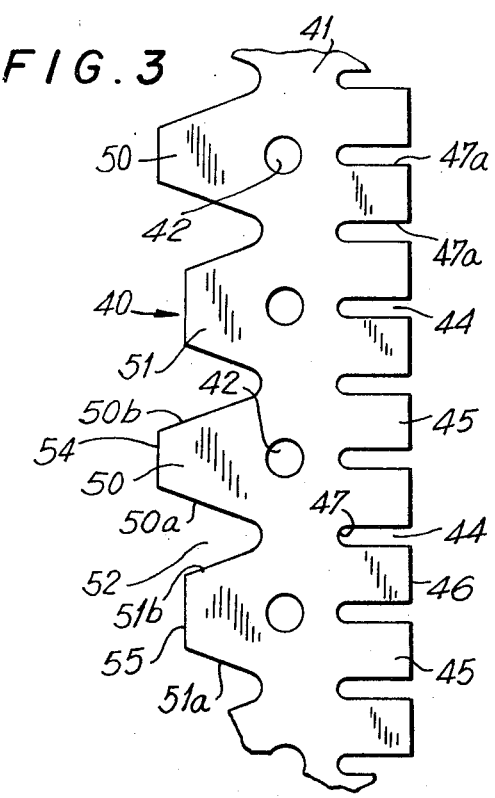
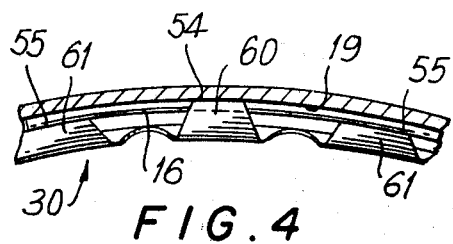
INVENTOR.
HERBERT BUERGER
BY J. B. Felshin
ATTORNEY

United States Patent Office 3,521,933
Patented July 28, 1970

3,521,933
WHEEL RIM MOUNTED DEVICES
Herbert Buerger, Walton, N.Y. 13856
Filed Aug. 7, 1968, Ser. No. 750,974
Int. Cl. B60b 7/06
U.S. Cl. 301—37      10 Claims

ABSTRACT OF THE DISCLOSURE

This device can be mounted on different types of wheel tire rims and has two different levels of spring pressure.

A wheel cover is assembled with an annular ring provided with shorter less flexible spring fingers alternating with longer more flexible spring fingers. The longer fingers project beyond the shorter fingers and act as guides for the trim as the device is assembled and to hold the wheel cover on the wheel. The shorter fingers enter recesses formed on the inner surfaces of the tire rim and prevent rotation of the trim. This device is universal for all wheels on the market.

BACKGROUND OF THE INVENTION

Field of the invention

This invention relates to wheel rings and wheel covers for automobile wheels provided with tire rims.

DESCRIPTION OF THE PRIOR ART

Wheel trims such as wheel rings or wheel covers that have spring grippers to engage automobile wheel tire rims are old and well known in the art.

SUMMARY OF THE INVENTION

An object of the invention is to provide a wheel trim that may be used for different types of wheels and has two levels of spring pressure to grip the rims.

Another object of this invention is to provide a device of the character described that is formed with longer, more flexible spring fingers alternating with shorter less flexible fingers all around to grip the tire rim at axially spaced circles of contact so that the device is universal for all wheels on the market.

Yet another object of this invention is to provide a strong, rugged and durable wheel trim of the character described which shall be relatively inexpensive to manufacture, easy to assemble with wheels of various makes, and which shall yet be practical and efficient to a high degree in use.

Other objects of this invention will in part be obvious and in part hereinafter pointed out.

The invention accordingly consists in the feature of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which are shown various illustrative embodiments of this invention, FIG. 1 is a partial radial cross-sectional view through an automobile tire rim and wheel trim embodying the invention;

FIG. 2 is a developed view of the grip ring forming part of the wheel trim;

FIG. 3 is a partial top plan view of the blank from which the grip ring is made; and FIG. 4 is a cross-sectional view taken on line 4—4 of FIG. 1.

DESCRIPTION OF THE PREFERRED EMBODIMENT

Referring now in detail to the drawing, 10 designates an automobile wheel comprising an outer tire rim 11, on which is mounted a wheel trim 12 embodying the invention. The tire rim 11 may have a usual disk spider wheel body (not shown) attached thereto. Said rim 11 comprises an annular cylindrical or axially extending web 14 from which there extends a radially and axially outwardly inclined annular flange 15. Extending from flange 15 is an annular axially extending flange 16 which may be formed adjacent its junction with flange 15, with outwardly radially extending bumps 17 forming annnular outwardly extending recesses 18 at its underside presenting shoulders 19 at the axially outer ends of said recesses. Shoulders 19 are internal.

Extending from flange 16 is a radially outwardly extending flange portion 20 from which extends a lip 21. A usual tire (not shown) is mounted on the outer side of the rim 11 in the usual manner.

The wheel trim 12 comprises an annular grip ring 30 attached to a wheel trim member 31 here shown, for the purpose of illustration, in the form of a wheel cover. The wheel trim member may comprise a wheel trim ring instead of a wheel cover. The wheel cover 31 comprises a central body portion 32 provided adjacent its outer periphery with an annular radial flange 33 disposed in a vertical plane. Extending from the outer periphery of the flange 33 is an inwardly rolled bead 34 having an inner edge 35 for attachment to a portion of the grip ring 30 in the manner hereinafter explained. The inner edge 35 is burred for the purpose explained later.

The grip ring 30 is made from the blank 40 shown in FIG. 3. The blank is die cut as a flat piece. Said blank 40 comprises an intermediate or central flat elongated portion 41 formed with a plurality of equally spaced holes 42 for use in piloting the strip through progressive dies. Said blank 40 is formed at one longitudinal side thereof with similar, equally spaced transverse slots 44 forming tabs 45 having edges 46. The edges 46 are in longitudinal alignment. The length of the slots 44 is about one-third the width of the blank. The inner ends of slots 44 are semicircles 47. The side edges 47a of tabs 45 have burrs for the purpose hereinafter appearing.

It will be noted that the holes 42 are transversely aligned with alternate notches 44, as shown in FIG. 3 of the drawing.

At the side of the blank 40 opposite to the tabs 45, are formed alternating long tabs 50 and short tabs 51 between which are notches 52. The bases of the tabs 50, 51 are similar. Tabs 50 have outwardly converging inclined edges 50a, 50b extending to an outer edge 54 disposed longitudinally of the blank. Tabs 51 have outwardly converging inclined edges 51a, 51b angularly similar to edges 50a, 50b but of less length than said edges 50a, 50b, and extending to longitudinal end edges 55 which are longer than edges 54. Thus tabs 50 are longer than tabs 51. The blank 40 is cut to a piece of desired length and rolled into a circle with the ends welded together. The blank piece is also die pressed to proper shape to make the grip ring 30. The piece should be of such length as to form a circle of correct diameter for assembly with the wheel cover 31, and for gripping the inside of the tire rim 11.

It will be noted that the tabs 50, 51 are centrally aligned with alternate slots 44; the notches 52 are aligned with alternate slots 52 that are disposed between the slots 44 which are aligned with the tabs 50, 51. The openings 42 are aligned with tabs 50, 51 and are disposed between the tabs 50, 51 and the alternate slots 44 which are centrally aligned with said tabs.

The tabs 45 are bent at right angles to the central portion of the blank, into a vertical plane to extend radially outwardly as shown at 45a in FIG. 2.

Said central portion 41 of the blank, between the tabs 45 and the tabs 50, 51 are corrugated transversely as shown at 41a. The base portions of the tabs 50, 51 are also similarly corrugated. The tabs 50, 51 constitute spring fingers.

The outer ends of tabs 50 are bent up into radially and axially outwardly inclined shape to form spring tips or lips 60. The outer ends of the shorter tabs 50b are bent into radially and axially outwardly inclined shape to form spring tips or lips 61. The spring fingers or tabs 50 being longer and narrower at their outer ends than spring fingers or tabs 51, are more flexible. The outer end edges 54 of spring tips or lips 60 engage the annular internal shoulders 19 and prevent rotation of the wheel trim relative to the wheel. The end edges 55 of spring tips or lips 61 engage the inner annular surface of flange 16 and hold the wheel trim on the wheel.

The outer surfaces of tabs 45a contact the inner surface of flange 33. The upper end edge portions of said tabs are disposed between the rolled bead 34 and said flange 33. The outer ends of said tabs are slightly rolled inwardly inside the bead. The burred end 35 of the bead digs into and against the inner surface of the tabs 45a between notches 44 to prevent rotation of the grip ring relative to the wheel cover.

The burred side edges 47a of tabs 45a dig into the inner surface of flange 33 of the wheel cover, just inside of the bead to aid in preventing relative rotation between the grip ring and the wheel cover.

The longer more flexible spring fingers engage the tire rim first, when assembling the wheel trim 12 with the rim 11, and act as guides that facilitate the assembly.

The wheel trim may be used with various type tire rims now on the market. Some tire rims do not employ the bumps 17. Some rims are wider than others. The wheel trim embodying the invention is universal to these. There are two levels of springs which alternate all around the wheel trim. The longer spring fingers are narrower and more flexible than the shorter, wider, less flexible spring fingers.

The corrugations stiffen the springs once the strip is formed into a circle.

It will thus be seen that there is provided an apparatus in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A wheel trim to be assembled with a tire rim and comprising a wheel trim member and a grip ring attached thereto, said grip ring having an axial flange formed with axial, longer more flexible spring retaining fingers and shorter, axial less flexible spring retaining fingers extending from one side of said axial flange, said longer fingers alternating with each one of said shorter fingers, and being closely spaced all around the grip ring and extending beyond said shorter spring fingers to engage said tire rim before the shorter spring fingers engage said tire rim upon assembling said wheel trim with said tire rim.

2. The combination of claim 1, and tabs extending radially in a single plane from the other side of said axial flange, and said wheel trim member having a radial flange contacting the outer surfaces of said tabs and means for attaching the outer end edge portions of said tabs to said radial flange.

3. The combination of claim 2, said spring fingers being aligned with alternate slots between said tabs.

4. The combination of claim 2, said axial flange being corrugated.

5. The combination of claim 2, said means for attaching said radial flange to said tabs comprising an annular bead on said flange rolled around the outer ends of said tabs.

6. The combination of claim 5, the outer end edge of said bead being burred.

7. The combination of claim 6, the side edges of said tabs being burred.

8. The combination of claim 1, said spring fingers having notches therebetween and being formed with converging inclined side edges.

9. The combination of claim 1, the outer ends of said spring fingers having axially and radially outwardly inclined lips.

10. The combination of claim 9, the inclination of the side edges of said all said spring fingers being of similar angularity.

References Cited

UNITED STATES PATENTS

| | | | |
|---|---|---|---|
| 2,809,076 | 10/1957 | Plotkin | 301—37 |
| 2,945,723 | 7/1960 | Estes. | |
| 2,964,355 | 12/1960 | Buerger | 301—37 |

RICHARD J. JOHNSON, Primary Examiner